(12) United States Patent
Bari

(10) Patent No.: US 9,505,633 B2
(45) Date of Patent: Nov. 29, 2016

(54) SUBMERGED FILTER INDICATOR

(76) Inventor: Naseem Bari, Little Lever (GB)

(*) Notice: Subject to any disclaimer, the term of this patent is extended or adjusted under 35 U.S.C. 154(b) by 0 days.

(21) Appl. No.: 13/277,984

(22) Filed: Oct. 20, 2011

(65) Prior Publication Data

US 2012/0152004 A1  Jun. 21, 2012

Related U.S. Application Data

(63) Continuation-in-part of application No. PCT/GB2010/040196, filed on Feb. 9, 2010.

(30) Foreign Application Priority Data

Apr. 20, 2009 (GB) .................................. 0906650.7

(51) Int. Cl.
*C02F 1/00* (2006.01)
*B01D 35/143* (2006.01)

(52) U.S. Cl.
CPC ............ *C02F 1/003* (2013.01); *B01D 35/143* (2013.01); *C02F 2209/42* (2013.01); *C02F 2209/445* (2013.01); *C02F 2307/04* (2013.01)

(58) Field of Classification Search
CPC . B01D 35/143; C02F 2209/445; C02F 1/003
USPC ................. 73/290 R, 304 R, 304 C
See application file for complete search history.

(56) References Cited

U.S. PATENT DOCUMENTS

| | | | |
|---|---|---|---|
| 5,523,927 A * | 6/1996 | Gokey ................. | A01K 27/006 362/103 |
| 6,074,550 A | 6/2000 | Hofmann et al. | |
| 6,224,751 B1 | 5/2001 | Hofmann et al. | |
| 6,417,925 B1 * | 7/2002 | Naya ............................ | 356/445 |
| 6,895,604 B1 * | 5/2005 | Ramsey ............... | A47K 13/307 4/213 |
| 7,318,344 B2 * | 1/2008 | Heger ......................... | 73/304 C |
| 7,487,677 B2 * | 2/2009 | Chai et al. .................. | 73/304 R |

(Continued)

FOREIGN PATENT DOCUMENTS

| | | |
|---|---|---|
| EP | 1 589 325 | 10/2005 |
| GB | 2 441 121 | 2/2008 |

(Continued)

OTHER PUBLICATIONS

English Machine Translation of Horiuchi, JP 11-351845, Dec. 24, 1999, Translated Jul. 2014.*

(Continued)

*Primary Examiner* — Hezron E Williams
*Assistant Examiner* — David Z Huang
(74) *Attorney, Agent, or Firm* — Marshall, Gerstein & Borun LLP

(57) ABSTRACT

The invention described herein, is a design that allows the amount of any liquid which is to be filtered, to be monitored while submerged yet remain contactless to the liquid in its measurement to indicate how much liquid has passed through the filter inside the jug/container or cartridge. It can indicate when a filter used in the container/jug holding the liquid has expired or can indicate how much liquid has been through the filter so the user can decide when it requires replacing. The status indication is displayed by using a motion sensor to give a user interaction display based on movement rather than direct contact of user. Currently all water utilize external indicators located on the jugs to monitor the usage of the filter.

16 Claims, 10 Drawing Sheets

(56) References Cited

U.S. PATENT DOCUMENTS

| | | |
|---|---|---|
| 2002/0060175 A1 | 5/2002 | Conrad et al. |
| 2006/0061542 A1* | 3/2006 | Stokic ............................ 345/156 |
| 2006/0279896 A1 | 12/2006 | Bruwer |
| 2007/0182710 A1* | 8/2007 | MacDonald et al. ......... 345/156 |
| 2007/0222624 A1* | 9/2007 | Eicken ................. A01K 15/021 340/573.3 |
| 2008/0093838 A1* | 4/2008 | Tropper et al. ................. 283/67 |
| 2009/0126482 A1* | 5/2009 | Fundak .................. A62B 9/006 73/293 |
| 2010/0060301 A1 | 3/2010 | Bruwer et al. |
| 2010/0117661 A1 | 5/2010 | Bruwer et al. |
| 2011/0148440 A1 | 6/2011 | Bruwer et al. |
| 2012/0281241 A1* | 11/2012 | Lai ............................... 356/615 |
| 2013/0174792 A1* | 7/2013 | Delabbio ............... A01K 61/00 119/200 |

FOREIGN PATENT DOCUMENTS

| | | |
|---|---|---|
| GB | 2 441 981 | 3/2008 |
| WO | WO 2005/085139 | 9/2005 |
| WO | WO2007/090622 | 8/2007 |
| WO | WO-2009/012832 A1 | 1/2009 |

OTHER PUBLICATIONS

International Search Report in corresponding PCT/GB2010/050196 dated Jul. 2, 2010.
Written Opinion in corresponding PCT/GB2010/050196 dated Jul. 2, 2010.
European Examination Report for Application No. 10708791.8, dated Feb. 26, 2015.
Summons to Attend Oral Proceedings Pursuant to Rule 115(1) EPC, European Application No. 10708791.8, dated Apr. 1, 2016.

* cited by examiner

SUBMERGED FILTER INDICATOR

This application is a continuation-in-part of and claims priority to International Application PCT/GB2010/050196 filed Feb. 9, 2010 which claims priority to GB 0906650.7 filed Apr. 20, 2009, the disclosures of which are hereby incorporated by reference herein in their entireties.

The invention described herein, is a design that allows the amount of any liquid which is to be filtered, to be monitored while submerged yet remain contactless to the liquid in its measurement to indicate how much liquid has passed through a filter inside a jug/container or cartridge. It can indicate when the filter used in the jug/container holding the liquid has expired or can indicate how much liquid has been through the filter so the user can decide when it requires replacing. The status indication is displayed by using a motion sensor to give a non-user interaction display based on movement rather than direct contact of user.

Currently all liquid filters utilize external indicators located on the jugs to monitor the usage of the filter.

The liquid filtration allows for liquid contamination, scale or debris to be removed so that the user can then either use or drink the liquid as required. Thus, it is important to know when the filter becomes unusable or when it becomes ineffective. Most devices used will also be in contact with liquid and so will be prone to measurement errors. Those devices that don't use contact in measurements do not then have any accuracy in the volume measurement of the liquid.

The numerous filter designs all indicate the usage of filter by either time or by interacting with the flow of liquid external to the liquid being filtered. The time based filter design is to allow an approximation of time since the filter was used and has no bearing on the amount of liquid actually filtered. Those filter designs using flow rates all require some means of interacting with the flow of liquid but have no real means of accurately measuring the volume of liquid as they have a minimal contact with the liquid.

This list is not exhaustive as there can be different monitoring methods both mechanical and user interactive. One additional variation is to factor in the number of users which implies the liquid filter usage will increase accordingly.

Only direct measurement of the liquid poured into the jug can give an accurate indication of when the filter cartridge is required to be replaced. However, this method relies on either mechanical intervention into the liquid stream i.e. a rotating paddle or a contact method. Both methods have advantages and disadvantages. The design shows that the indicator unit can be submerged into the liquid it is measuring.

The technique is based on that the filter unit allows the passage of liquid through its filter compound/granules at a constant speed. This speed only changes as the filter begins to accumulate in particles it is filtering. However, this too can be compensated due to the fact that the length of time will increase as the same volume of liquid is passed through.

It is, however, understood that even if the amount of liquid passed through the filter is less than it can filter the time taken must be taken into account from first use to prevent bacteria from building up inside the filter. This means that the filter must indicate the expiry of the filter based on the manufactures recommended time.

SUMMARY OF THE INVENTION

The invention described herein is based on that, the indicator unit is submerged and held in the container/jug at the base of the filter compartment. The indication is visible through the liquid and through the see through container/jug. (Most liquid containers are usually made "see through" to allow the user to see how much liquid has been poured in). From first contact of liquid, the indicator unit monitors when the liquid is input to the jug. From this, it can determine the amount of liquid filtered through or the number of times the jug has been filled. The measurement can be displayed as a count down from the number of times the filter can be used. This can be done by any number of ways of which the following are mentioned and are not limited to, methods such as LCD display that displays a number from which the unit counts down or up, or LEDs which can either change color or individually turn on to indicate a band of usage.

A band of usage can be interpreted to indicate the remaining life of the filter e.g. when the unit is new, half used and near exhausted (fully used). A total time the filter has been used for can also result in indicating the filter is required to be changed. This is usually the result of a filter that has been left without use for a period of time the manufactures recommend that the filter should be disposed of. Or if a more precise volume of liquid is required, it can be shown by indicating the amount of liters that have passed through the filter.

Such measurements overcome the requirement of indicating how many users are using the liquid filter. This also overcomes the need for the user to remember if he has mechanically adjusted the indicator or any interaction required by the user.

Preferably the method of measurement is achieved by measuring the time the liquid remains in the presence of the probes, but not in direct contact. This presence of liquid will be detected by the probes. In some cases, it maybe preferable to use direct contact to the liquid because the filter is to be disposed of in a period of 30 days. In longer life time indicators then non-contact with the liquid maybe be preferred.

Preferably an algorithm is used for the calculation of quantity of liquid filtered and the number of times the filter has been used. The algorithm used will then adjust the time when the filter cartridge is to be replaced.

Preferably this measurement method will be based on the filter cartridge characteristics, especially as every filter type can vary the liquid filtration period.

Preferably the design algorithm can be adjusted to compensate for this so that the unit can be adapted for different manufactures and methods of filtration. Preferably the indicator can compensate for the different types of liquid and its contaminants to allow the indicator to accurately measure the amount of flow rate.

Preferably the unit uses the motion sensor to detect the usage of the jug to then display the status on when it is used rather than to waste energy in displaying the status when the user is not present.

Preferably there are no limits to the packaging as it can be mechanically designed to be incorporated into different manufactured containers. The concept is that such a device can be housed inside the jug or container, fixed or loosely coupled to the face of the jug/kettle unit. The indicator then shows on the front face of the filter, the status, while the sensor probes provide the measurement. The indicator can be attached to any wall of the jug/kettle or clipped/housed in the filter cartridge itself.

Preferably the incorporation of the device will depend on the body of the container. The concepts described herein can be physically adapted to each manufacturer. Preferably the method of integration of the unit into the jug container will vary depending on which face the unit is inserted inside the jug depending on left or right handed users. The indicator is placed onto the jug by sliding the unit into position but allowing it to be removed anytime to reset the indicator when the filter cartridge is to be replaced. There can be many ways by which the indicator can be held in the jug/container but the main purpose is to allow the indicator to visibly show the status of the filter. The indicator can be mounted onto the body of the filter cartridge base and direct the LED light into the base of the jug. Or in another embodiment, it can be inserted into the filter cartridge itself, allowing for the light of each Light Emitting Diode (LED) to be transmitted through the liquid in either the base of the jug or the top of the jug. The position can be in the base of the cartridge and use light guide pipes to guide light upwards to the top of the cartridge or vice versa.

The main function of the indicator is that it is flexible. It can be incorporated in either the interior of the jug or the cartridge and measure the amount of liquid passed through it. The indicator may be arranged to monitor the liquid filtered by count upwards or downwards, and may have a fixed upper limit or a fixed starting number, respectively. Alternatively, the indicator may allow the upper limit or the starting number to be set for an appropriate filter characteristic. The indicator could be set to provide a means of indicating the volume of liquid that has been measured rather than the expiry of the filter.

Preferably the display means provides at least a warning when the used filter corresponds to the upper limit or the starting number has been dispensed. Alternative warning means may also (or alternatively) be used, however.

Particular examples of the display means are a mechanical display, a clock, and/or a liquid crystal display (LCD) (any, or all, of which may display the amount of filter used/or remaining, and may display other information as well) and/or (LEDs), which may, according to the patterns/colors displayed, indicate one or more states of the filter usage (e.g. full, in use, nearly empty and/or empty).

In one embodiment, before the indicator reaches a first predetermined level, a first LED is lit permanently or flashes in a first predetermined pattern, and when the indicator reaches the second predetermined level, a second LED is lit or flashes in a predetermined pattern. The display means may include a green LED as the first LED and a red LED as the second LED. Thus, in normal use, the green LED may be lit permanently. When the numbers of uses of the filter remain (for example, 10 more jugs remaining), the green LED may flash continuously. When there are no more jug filters remaining in the filter cartridge, the green LED is no longer lit and the red LED may be lit permanently. In this way, the user can be given some warning that the filter cartridge is about to run out, and so be able to obtain a replacement cartridge assembly before it becomes necessary. This is where the key feature of this patent comes into effect and the motion sensor plays its part. In order to ensure that the user sees the change in status of the indicator and not just waste the limited amount of battery energy, the status will only be energized when the indicator detects the user has moved the jug/container/vessel. This is the key to ensure that the indicator can be used the most efficient way possible. When the user is not around then the energy is conserved.

In a different embodiment, the display means may include at least two and preferably three LEDs. Preferably, the display means includes control means for operating one or more of the LEDs for a predetermined time interval, at a predetermined point in the operation of the device. For example, the LEDs may activate for a predetermined time, e.g. 10, 15 or 20 seconds, immediately after the cartridge has been activated. In one example, a green LED would flash when the cartridge was operating normally, an amber LED would instead operate or flash when a set level is reached (e.g. the cartridge is becoming nearly empty) and a red LED would operate or flash when the cartridge is fully used. The operation of the LEDs for a suitable time after a period of use of the cartridge has the advantages of conserving battery life and also serving as an indication that the filter is in use. The position of the LEDs is determined by the direction of light required in the embodiment. As such the LED can be positioned in any axis to allow the light to be visible in any desired direction. This can be portrayed by using light guide pipes within the design or even allow the indicator to be manufactured of clear material in which the light is omnidirectional.

In another embodiment the indicator can show the amount of volume of liquid that has passed in the filter by means of an LCD display showing the number of liters in figure form or by other pictorial means.

Preferably, all of the components of the indicator, sensors, switch and display means are sealed within a body case and preferably that body is waterproof.

When electronic components are used, various orientations and locations of the circuitry within the body are envisaged. Preferably some of the electronics are mounted on a printed circuit board, and more preferably that circuit board is made from a flexible substrate which allows that circuit board to be fitted into the best location in the body. An ASIC (Application Specific Integrated Circuit) can be used to minimize the power required by the indicator.

Preferably, the external body parts of the indicator can be made of silicon, PC, ABS or other materials that blend to the use of allowing the indicator to be submerged wholly or partly and allow the status of the filter to be visibly seen by the user.

The liquid sensors may be mounted on the indicator so that when the liquid comes into contact, it is continuously in contact until the last few drops and the sensors show that there is no more liquid. The sensors are triggered thereby indicating that the liquid has been filtered and that the time the sensors were in contact indicate the volume of liquid filtered from the cartridge.

It is preferable that the sensors are wholly contained inside the plastic molded housing. Where it is preferred to have the sensors in contact it is preferred that they are molded at the same time as the body is formed. In a preferred embodiment of this, the sensor includes two or more electrical contacts preformed for maximum sensitivity.

As an alternative embodiment it is preferred that the sensors are underneath the main indicator plastic cover to remain unconnected to the liquid. The sensor sensitivity is then controlled to measure the presence of liquid through the plastic surface. This then allows the sensor probes to remain isolated from the liquid under measurement. The sensors then remain unaffected by the liquid contaminants.

Preferably, a casing according to the present invention is adapted so as to allow the display means, to be visible at least some of the time.

Preferably the indicator will have a motion sensor which will be activated by the action of tilting the jug to either pour liquid out of the jug or by tilting to pour liquid into the jug. The sensitivity of the motion sensor will depend on the jug design and so can be set for either sensing motion or just the action of tilting. The indicator unit can remain in a standby condition until the motion sensor detects movement in which case it wakes up and proceeds to indicate the status of the filter.

The contactless sensor may be a capacitive sensor. The contactless sensor may be an AZQ1345 contactless sensor available from Azoteq (PTY) Ltd of South Africa.

BRIEF DESCRIPTION OF THE DRAWINGS

The following figures show the particular embodiments of the present invention and will be described in relation to these figures, in which:

In FIG. 1, a cartridge [1] has an indicator [2] housed in a cartridge filter. The indicator [2] allows the indication of light to be directed towards the top half of the jug through a window area [3]. In this design the sensor probes are under the main cover plastic housing to ensure they are not in direct contact to the liquid under measurement.

The design assembly of the indicator in FIG. 3 will preferably have a PCB [4] with a processor or Application Specific Integrated circuit (ASIC) having ancillary components required to provide the function of the indicator. In FIG. 3 the attachment includes a clear body cover [9], which is the cover of the indicator assembly. The PCB assembly [4] fits into the cover [9] and the sensor probes are under the cover [9] to allow a change in sensitivity of each sensor in the presence of liquid across the indicator surface. The cover [9] has a window area [3] to act as lens for the LEDs. In this embodiment a base [21] is a top cover of the cartridge [1].

The indicator assembly is housed in the top cover of the cartridge and then welded into place to allow the whole assembly to become waterproof. A battery clip [5] holds a battery [6] in position and provide power for the indicator.

Figure 1:
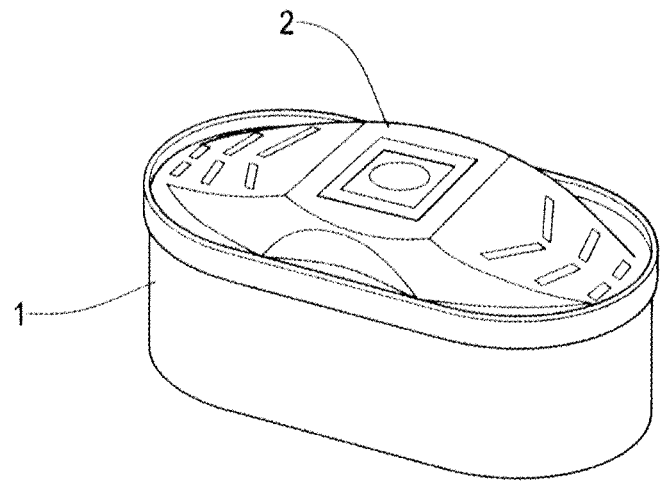
FIG. 1 shows an indicator assembled to a filter cartridge and an attachment according to the present invention.
Figure 2:
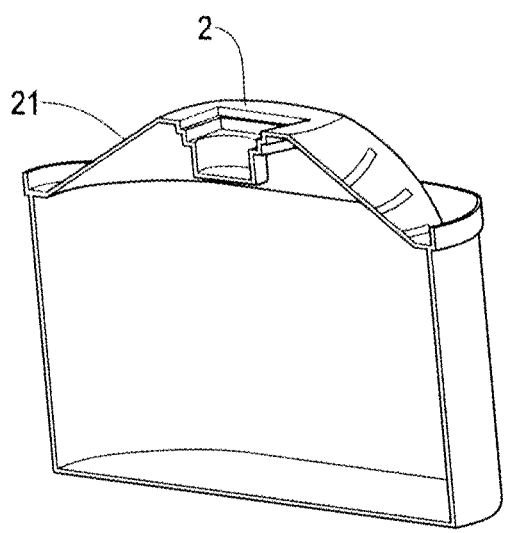
FIG. 2 is a section view of the attachment FIG. 1.
Figure 3:
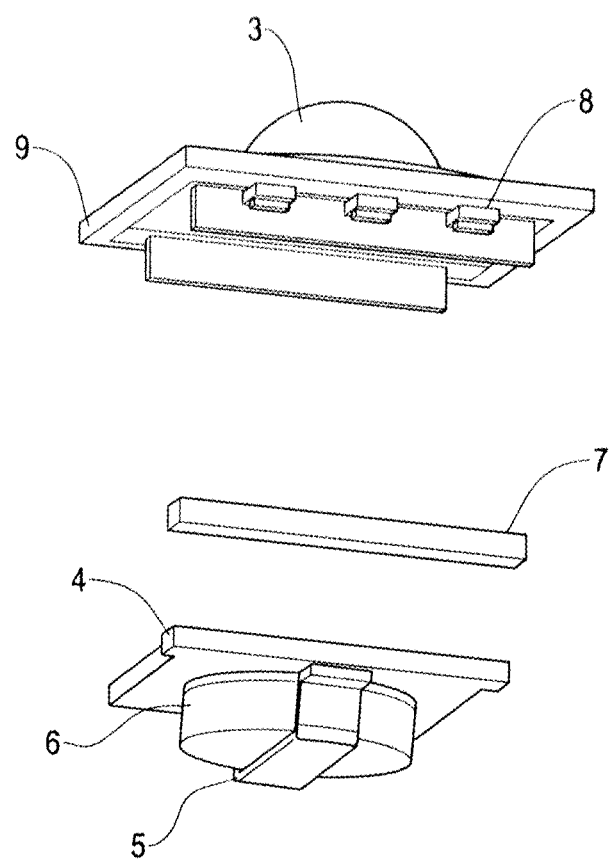
FIG. 3 shows the indicator assembly exploded from the cartridge.

An elastomer [7] provides the connectivity to sensor probes [8] which can be either positioned underneath the cover [9] or molded as part of the cover attachment but without penetrating through the surface of the cover as shown in FIG. 2 and FIG. 3.

An LED indicator dome [3] allows the light to be directed towards the top of the cartridge. In this application the indicator always indicates into the top part of the jug.

Figure 4:
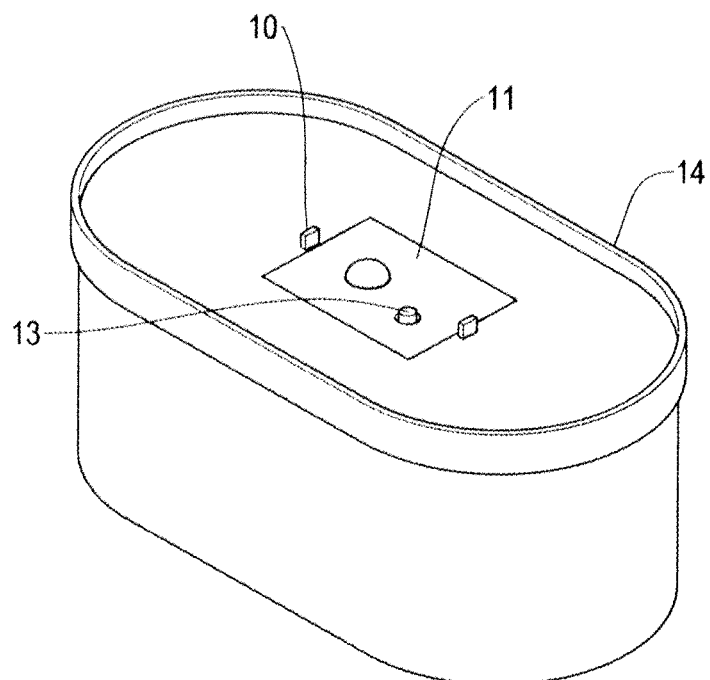
FIG. 4 shows an alternative embodiment in the cartridge that allows the indicator to be unclipped from the cartridge.

FIG. 4 is another embodiment that allows an indicator [11] to be unclipped from a cartridge [14] using side tabs [10] shown either side of the indicator. In this embodiment the indicator can be removed and reinserted into another filter when required i.e. when the filter is exhausted or its lifetime is indicated by the indicator. A switch [13] in this embodiment allows the reset of the indicator when it is activated by pressing and holding down for a defined period of time.

Figure 5:
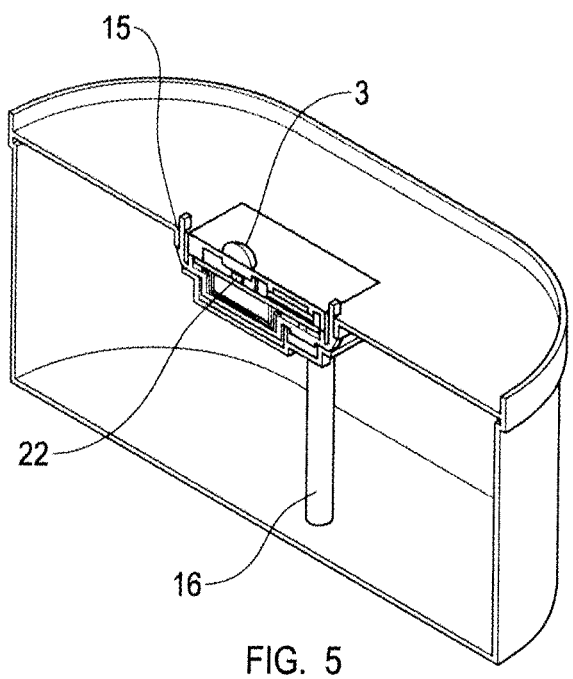
FIG. 5 shows the cross section of the indicator inside the cartridge.

FIGS. 4 and 5 show that in this embodiment the sensor probes are molded as part of the cover and protrude out to make surface contact with the liquid. In this embodiment, the LED light can be directed towards both the top and bottom of the jug by using a light guide pipe [16] molded as part of a base housing [15].

A bottom LED [19] light is positioned over the light guide underneath the PCB. A top LED [20] directs light towards the top surface of the jug. A hole at the end of the light pipe [16] has a small ring seal to prevent unfiltered liquid being passed through.

Figure 6:
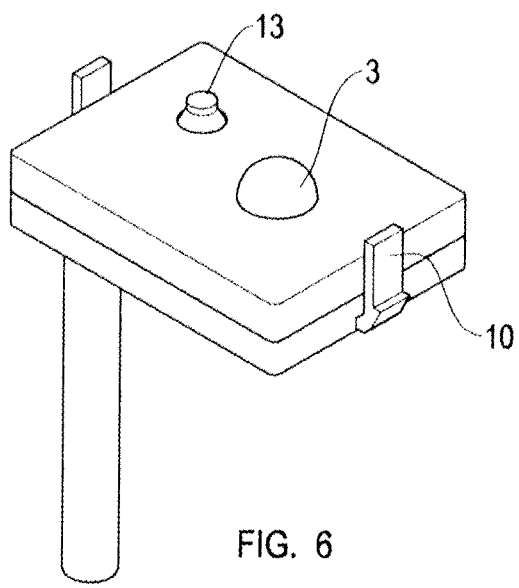
FIG. 6 shows the indicator module assembly.

FIG. 6 shows the whole indicator assembly and the salient points of the body design.

Figure 7:
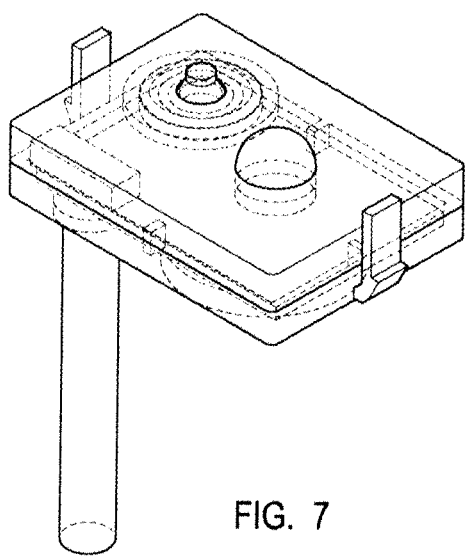
FIG. 7 shows the indicator assembly fully assembled in a see through illustration.
Figure 8:
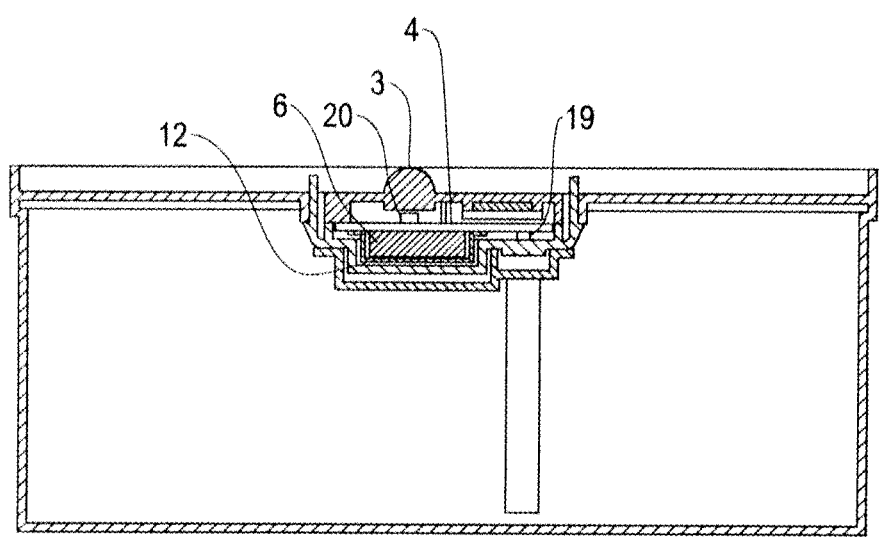
FIG. 8 gives the details of the cross section of the cartridge assembly.
Figure 9:
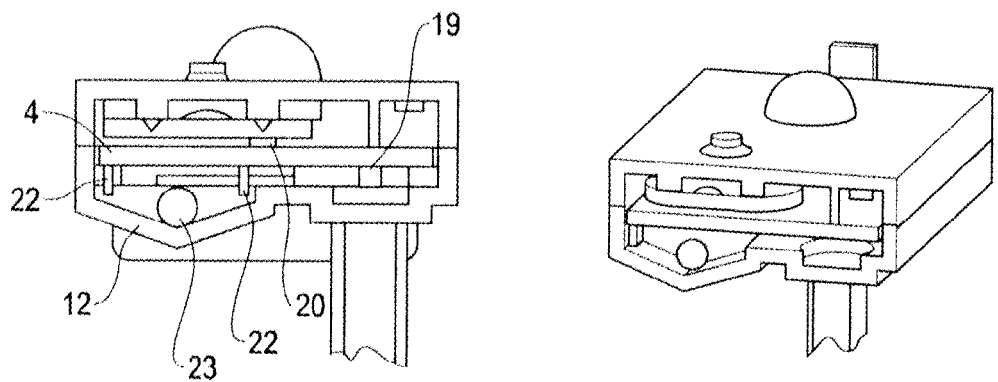
FIG. 9 shows the normal displacement of the motion sensor when in the rest position.

FIG. 7 illustrates the assembly placement of the parts within the indicator body. FIG. 8 shows the cross section of the components for an indicator that allows the LED light to be directed in any direction towards the top or bottom of the cartridge.

When the liquid is sensed by the liquid sensor, the indicator becomes active to measure the time the liquid is filtered through using the sensing probes. The ASIC or processor is used to monitor, count and display the filter usage. The processor can use algorithms by which means it will determine the use of the filter and what the indicator will display on indicating the usage.

The cover [9] shown in FIG. 3 also has viewing means which may be cut out from the body, or be an integral part of the body which is translucent. This allows display [3] (in this case an LED, but it could be other means e.g. LCD, one or more LEDs) to be visible to the user through the body of the indicator. It will be appreciated that many other ways of mounting the display are possible, and this is purely an example. The power source [6] is a suitable battery depending upon the lifetime of the indicator required based on the filter characteristics.

Although there are different methods of assembly, the main feature is that an indicator will provide a means of indicating when the filter is used or is exhausted. Using LEDs to display the state of the indicator rather than an LCD connected to the counter is a much more effective means of display. An LED light flashing is much more likely to attract attention than an LCD with flashing segments. This is because to view the LCD one has to be close to it, whereas an LED can be seen at a distance. The embodiment shows that when using LEDs as the display means, the attachment can be made much smaller, since there is no need to incorporate the display. The translucent body can transmit the light from the LED.

Whatever form the display means takes, in order to minimize the size of the attachment, some or all of the electrical components may be mounted on a printed circuit board or made from flexible substrate, which allows the circuit board to be fitted into a smaller space. The battery can be mounted using the clip [5] or alternative means of connecting power to the indicator electronics such as conductive adhesive, carbon printing, soldering are just a few methods.

There are many methods of fixing the indicator to the body of the cartridge and FIG. 5 show an embodiment which gives an alternative clip method using clips [10] which allows the indicator to clip into a filter cartridge.

Figure 10:
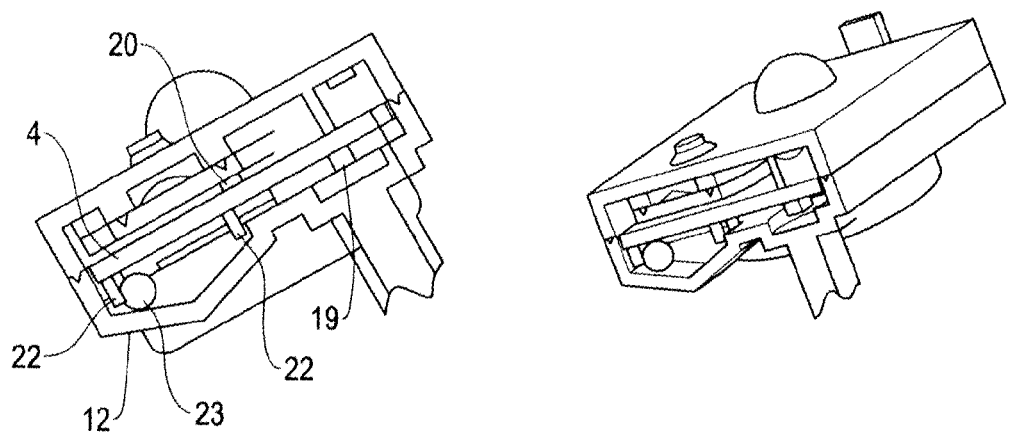
FIG. 10 shows the motion sensor position when activated.

The number of ways to fix the indicator are by no means limited to those shown in the embodiments given. FIG. 10 shows the motion sensor in its rest mode. This is the method in which the indicator determines when the jug is not being handled by the user. The indicator houses a small ball bearing [23]. The ball bearing [23] is trapped between the PCB [4] and the base molding [12]. The only movement allowed for the ball bearing [23] is in the axis of the groove in the base molding [12] that extends across the PCB [4] between two posts [22] on either side of the PCB.

Figure 11:
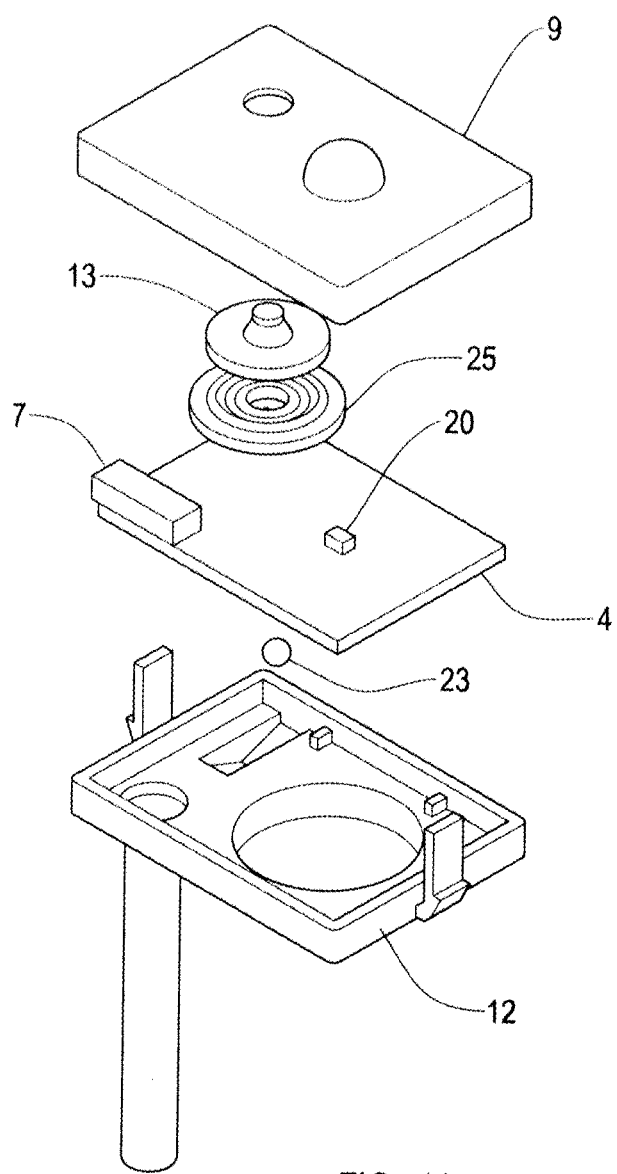
FIG. 11 shows the exploded view of the indicator parts.

FIG. 10 shows the motion sensor in its active mode. This is the method in which the indicator determines when the jug is being handled by the user. It is a direct means of user interaction, without direct contact in full flow. As shown, the ball bearing [23] rolls in either direction depending on the tilt of the jug itself. It does not matter in which direction as once the ball bearing [23] makes contacts to the posts [22] the ASIC receives a signal and wakes up from standby to shine the LED [20] for the top or the LED [19] for the bottom. FIG. 11 shows the assembly exploded for this embodiment.

Figure 12:
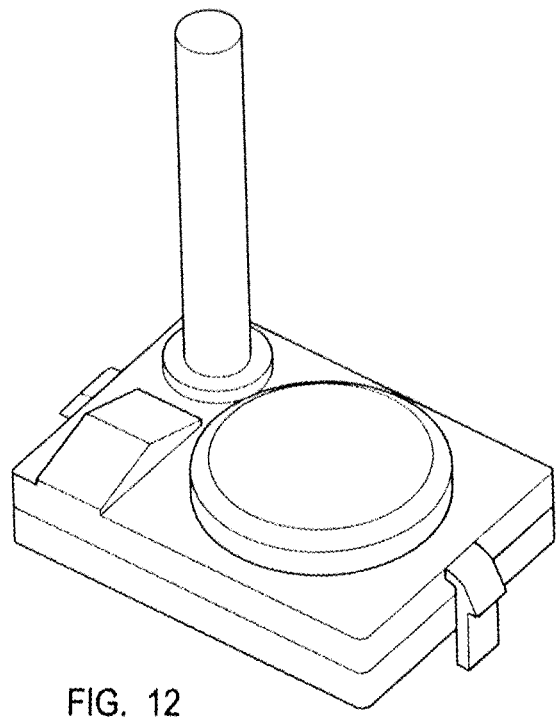
FIG. 12 shows the indicator rear assembly view.
Figure 13:
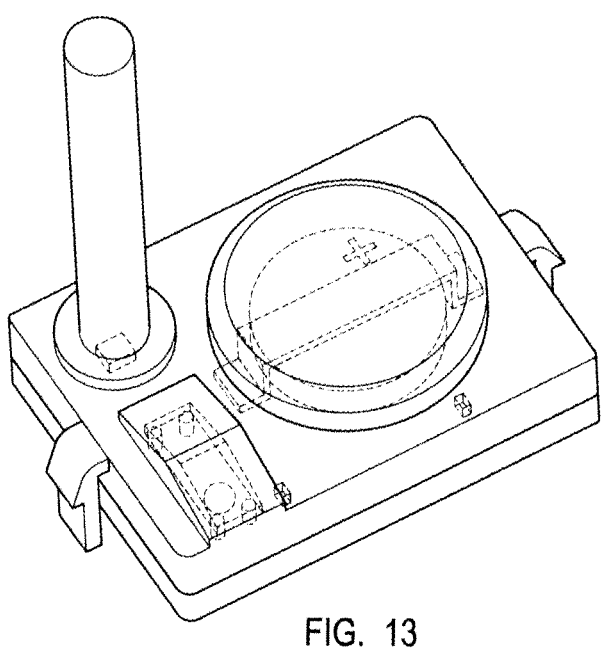
FIG. 13 shows the see through view of the rear of the indicator.

A weld plate disk [25] is welded to the front cover [9] and makes a waterproof switch. It can also be compressed by the PCB [4] to create the compression of the rubber switch [13]. FIG. 12 shows the view from underneath the assembly and FIG. 13 gives a see through view of the design.

Figure 14:
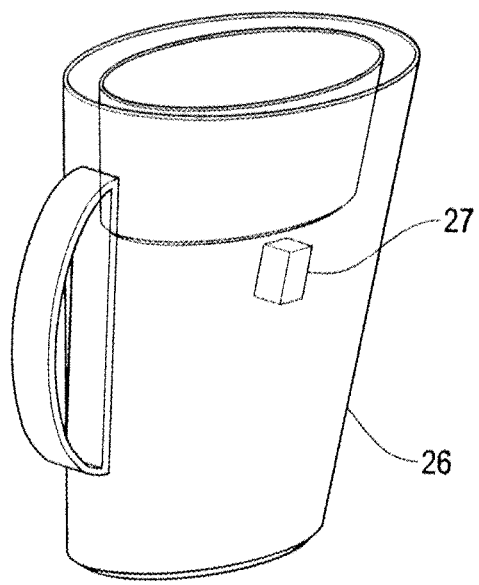
FIG. 14 shows the indicator assembly into the jug bottom position.
Figure 15:
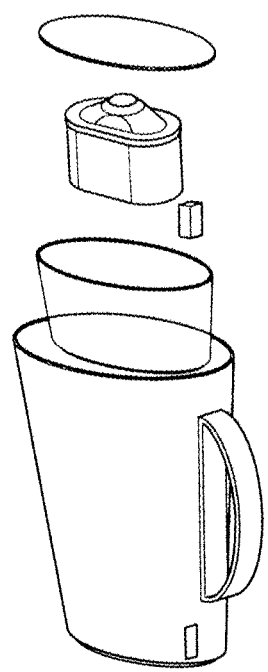
FIG. 15 shows the jug explode view of the all the parts.

FIG. 14 shows an embodiment were the indicator [27] is able to be attached to the side of the jug in order to provide the same design features of being attached to the filter cartridge. In this mode the indicator is configured to shine the LED light into the jug liquid as well as externally through the side wall of the bottom half of the jug [26].

Figure 16:
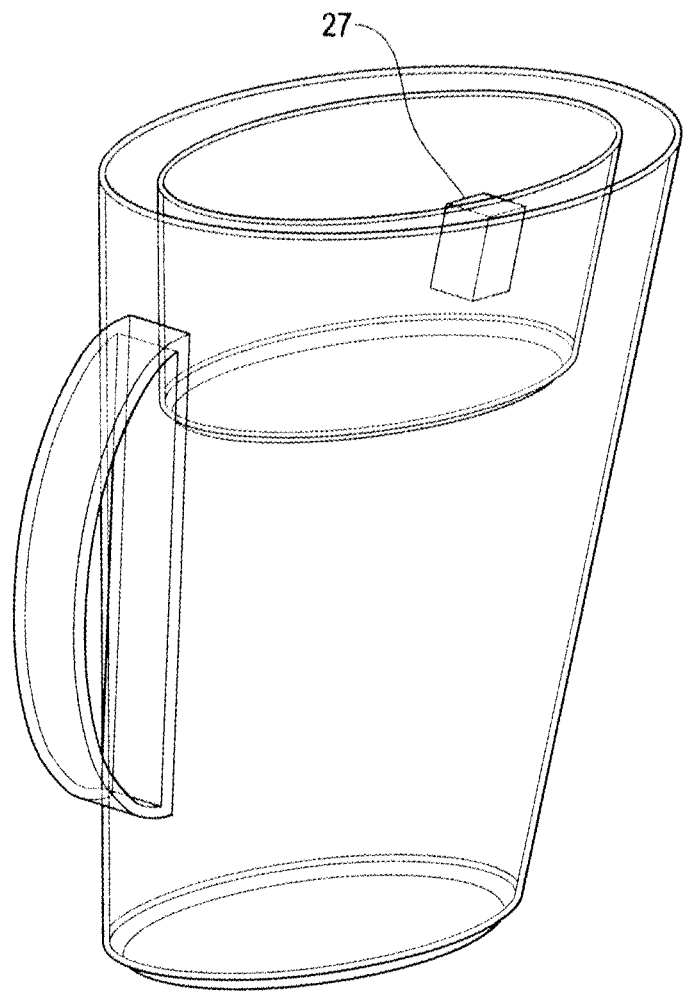
FIG. 16 shows the indicator in the top section of the jug.

FIG. 16 shows the alternative embodiment of the indicator connected onto the side wall of the upper jug [28] that holds the unfiltered liquid. The measurement of the liquid is similar in both cases whether it is filtered or unfiltered liquid. The indicator attachment to the wall of the jug can be made by a sliding mechanism as part of the jug so that the device can be removed easily for replacement or cleaning. The position is based on the level of liquid expected when the jug is full to indicate a full jug for each measurement. The function of the algorithm in the ASIC will allow this to be configured according to the embodiment of the design.

It is to be understood that variants of the above described examples of the invention in its various aspects, such as would be readily apparent to the skilled person, and may be made without departing from the scope of the invention in any of its aspects.

The invention claimed is:

1. An indicator assembly, waterproof and suitable for attaching or placing into a vessel and submerged inside a liquid to be measured, to show usage of a filter over a period of time until the filter is exhausted, the indicator assembly comprising:
   a body configured for removable coupling to a face of the vessel or the filter,
   a contactless sensor disposed within the body to detect or measure the volume of liquid passing through the filter,
   a display including a top LED, a bottom LED and a light guide pipe, wherein the top LED is configured to direct light upward through an LED indicator dome, the bottom LED is positioned over the light guide pipe to direct light downward into the light guide pipe and the light guide pipe is configured to extend into the liquid and to transmit light from the bottom LED through the liquid, and
   a motion sensor within the body to activate the display on movement of the vessel, wherein the indicator assembly is configured to use the motion sensor to activate the top LED and the bottom LED to direct light into the liquid using the light guide pipe, the light being externally visible, to show a status of the usage of the filter, such that the status of the usage of the filter is determined by the light directed into the liquid by the bottom LED and upward by the top LED.

2. The indicator assembly according to claim 1, wherein the assembly is configured to be reset to continue to measure the filter usage.

3. The indicator assembly according to claim 2, wherein the display displays information derived from the measured volume of liquid.

4. The indicator assembly according to claim 2, further comprising a printed circuit board to which one or more electronic components are connected, such that the top LED is mounted on an opposing side of the printed circuit board to the bottom LED.

5. The indicator assembly according to claim 2, further comprising an electronic circuit, wherein probes of the contactless sensor are connected to the electronic circuit, and a battery providing an energy source, wherein the display is configured to show the filter usage.

6. The indicator assembly according to claim 1, wherein the assembly uses a non-contact method, without direct contact to the liquid, to determine information on the presence of the liquid, then uses the information to calculate or interpret the usage of the filter.

7. The indicator assembly according to claim 1, wherein the top and bottom LEDs are configured to indicate the remaining life of the filter such that an indication is given as to when the filter is new, half used and near exhausted.

8. The indicator assembly according to claim 1, wherein the display includes an LCD configured to indicate the remaining life of the filter such that an indication is given as to when the filter is new, half used and near exhausted.

9. The indicator assembly according to claim 1, wherein the display comprises an LCD configured to indicate a quantity of liquid that has been filtered.

10. The indicator assembly according to claim 1, wherein the contactless sensor is configured to measure the volume of liquid passing through the filter and includes a counter for storing count information derivable from the number of detected actuations of the contactless sensor.

11. The indicator assembly according to claim 10 wherein the count is triggerable in response to a sensed parameter sensed by the contactless sensor and an algorithm is utilized to derive the usage of the filter.

12. The indicator assembly according to claim 1, wherein the assembly includes a waterproof body which encloses the components of the indicator assembly.

13. The indicator assembly according to claim 1, wherein the motion sensor comprises:
   a groove in a base molding, two pairs of parallel posts and a ball bearing, the groove including two angled surfaces which connect at a lowest point and the pairs of parallel posts being located at each end of the base molding, the groove being configured such that when the vessel is in a substantially upright position the lowest point of the groove provides a position for the ball bearing where the ball bearing remains substantially stationary, when the vessel is tipped the ball bearing moves along one of the angled surfaces to make contact with the two posts of one of the pairs of parallel posts to activate the display.

14. The indicator assembly according to claim 1, wherein the contactless sensor is a capacitive sensor.

15. An indicator assembly, waterproof and suitable for attaching or placing into a vessel, and submergeable inside a liquid to be measured, to show usage of a filter over a period of time until the filter is exhausted, the indicator assembly comprising:
    a body configured for removable coupling to a face of the vessel or the filter,
    a contactless sensor disposed within the body to detect or measure the volume of liquid passing through the filter,
    a display within the body, and
    a motion sensor within the body to activate the display on movement of the vessel, the motion sensor including:
    a groove in a base molding, two pairs of parallel posts and a ball bearing, the groove including two angled surfaces which connect at a lowest point and the pairs of parallel posts being located at each end of the base molding, the groove being configured such that when the vessel is in a substantially upright position the lowest point of the groove provides a position for the ball bearing where the ball bearing remains substantially stationary, when the vessel is tipped the ball bearing moves in a direction along one of the angled surfaces to make contact with the two posts of one of the pairs of parallel posts to activate the display.

16. An indicator assembly according to claim 15, wherein the two posts of each pair of posts are separated by a distance, the distance being substantially perpendicular to the direction in which the ball bearing moves in, when the vessel is tipped.

* * * * *